US012052809B2

(12) United States Patent
Shi et al.

(10) Patent No.: US 12,052,809 B2
(45) Date of Patent: Jul. 30, 2024

(54) LUMINAIRE AND LUMINAIRE CONTROL SYSTEM

(71) Applicants: OPPLE LIGHTING CO., LTD., Shanghai (CN); SUZHOU OPPLE LIGHTING CO., LTD., Suzhou (CN)

(72) Inventors: Haoyang Shi, Suzhou (CN); Jun Wu, Suzhou (CN)

(73) Assignees: OPPLE LIGHTING CO., LTD., Shanghai (CN); SUZHOU OPPLE LIGHTING CO., LTD., Jiangsu (CN)

( * ) Notice: Subject to any disclaimer, the term of this patent is extended or adjusted under 35 U.S.C. 154(b) by 106 days.

(21) Appl. No.: 17/564,179

(22) Filed: Dec. 28, 2021

(65) Prior Publication Data

US 2022/0124900 A1 Apr. 21, 2022

Related U.S. Application Data

(63) Continuation of application No. PCT/CN2020/105186, filed on Jul. 28, 2020.

(30) Foreign Application Priority Data

Jul. 31, 2019 (CN) ........................ 201921218041.2

(51) Int. Cl.
*H05B 47/19* (2020.01)
*F21V 23/00* (2015.01)
(Continued)

(52) U.S. Cl.
CPC ........... *H05B 47/19* (2020.01); *F21V 23/003* (2013.01); *F21Y 2115/10* (2016.08); *H05B 45/10* (2020.01)

(58) Field of Classification Search
CPC ...... H05B 47/175; H05B 47/19; H05B 45/10; H05B 45/20; F21V 23/003; F21Y 2115/10
See application file for complete search history.

(56) References Cited

U.S. PATENT DOCUMENTS

| | | | |
|---|---|---|---|
| 8,278,844 B2 | 10/2012 | Qin | |
| 8,294,373 B2 | 10/2012 | Ko et al. | |
| 10,064,258 B2 | 8/2018 | Lee et al. | |

(Continued)

FOREIGN PATENT DOCUMENTS

| | | | | |
|---|---|---|---|---|
| AU | 2017210596 A1 * | 8/2017 | ............ G06N 3/086 | |
| CN | 101608755 A | 12/2009 | | |

(Continued)

OTHER PUBLICATIONS

International Search Report of PCT Application No. PCT/CN2020/105186 dated Oct. 28, 2020 with English translation, (4p).

*Primary Examiner* — Raymond R Chai
(74) *Attorney, Agent, or Firm* — Arch & Lake LLP

(57) ABSTRACT

The present disclosure relates to a luminaire and a luminaire control system. The luminaire includes a controller, a power supply driver, a controllable switch, and a light-emitting unit; the power supply driver is connected to external alternating current and supplies power to the controller and the light-emitting unit; the controller is connected to both the power supply driver and the controllable switch through control signal wires; the controllable switch is disposed in a circuit between the power supply driver and the light-emitting unit; wherein the controller is in wired or wireless connection with a user control device to receive a control signal from a user; and a total number of the controllable switch disposed between the power supply driver and the light-emitting unit is one or more.

10 Claims, 3 Drawing Sheets

(51) Int. Cl.
*F21Y 115/10* (2016.01)
*H05B 45/10* (2020.01)

(56) References Cited

U.S. PATENT DOCUMENTS

| | | | | |
|---|---|---|---|---|
| 10,165,661 | B2 * | 12/2018 | Thijssen | H05B 47/175 |
| 10,314,124 | B1 * | 6/2019 | Yang | H05B 47/20 |
| 11,189,948 | B1 * | 11/2021 | King | H02G 3/14 |
| 11,670,957 | B2 * | 6/2023 | DeJonge | H05B 45/38 315/86 |
| 2002/0050807 | A1 * | 5/2002 | Janik | H01R 13/6675 320/137 |
| 2009/0315466 | A1 | 12/2009 | Ko et al. | |
| 2011/0089847 | A1 | 4/2011 | Qin | |
| 2016/0181036 | A1 * | 6/2016 | Langdon, II | H05B 47/19 361/191 |
| 2017/0079122 | A1 | 3/2017 | Lee et al. | |
| 2017/0127483 | A1 | 5/2017 | Chiang | |
| 2018/0242426 | A1 * | 8/2018 | Trickler | H05B 47/11 |
| 2019/0075636 | A1 * | 3/2019 | Spira | H05B 45/10 |
| 2019/0141824 | A1 * | 5/2019 | De Jong | H05B 47/1965 |
| 2020/0352009 | A1 * | 11/2020 | Smith | H05B 47/199 |
| 2021/0003982 | A1 * | 1/2021 | Wang | H01H 47/00 |
| 2023/0092156 | A1 * | 3/2023 | Dimberg | G06F 3/04847 |
| 2023/0229295 | A1 * | 7/2023 | Weber | G06F 3/04847 345/73 |

FOREIGN PATENT DOCUMENTS

| | | | |
|---|---|---|---|
| CN | 201541386 | U | 8/2010 |
| CN | 106900101 | A | 6/2017 |
| CN | 207560421 | U | 6/2018 |
| CN | 210868256 | U | 6/2020 |

* cited by examiner

LUMINAIRE AND LUMINAIRE CONTROL SYSTEM

CROSS-REFERENCE TO RELATED APPLICATIONS

This application is based upon and claims the priority of PCT patent application No. PCT/CN2020/105186 filed on Jul. 28, 2020 which claims priority to the Chinese patent application No. 201921218041.2 filed on Jul. 31, 2019, the entire contents of which are hereby incorporated by reference herein for all purposes.

TECHNICAL FIELD

The present disclosure belongs to the field of luminaires, and in particular, relates to a luminaire and a luminaire control system.

BACKGROUND

The control architecture for a lighting electrical appliance is a solution of a drive power source plus a controller, where the drive power source converts alternating current (AC) from public mains supply into direct current (DC), and the controller controls the magnitude of the DC to adjust the brightness or light color of the lighting electrical appliance.

SUMMARY

The present disclosure provides a luminaire and a luminaire control system.

According to a first aspect, a luminaire is provided. The luminaire may include a controller, a power supply driver, a controllable switch, and a light-emitting unit. The power supply driver may be connected to external alternating current and supplies power to the controller and the light-emitting unit; the controller may be connected to both the power supply driver and the controllable switch through control signal wires; the controllable switch may be disposed in a circuit between the power supply driver and the light-emitting unit. The controller may be in wired or wireless connection with a user control device to receive a control signal from a user; and a total number of the controllable switch disposed between the power supply driver and the light-emitting unit may be one or more.

According to a second aspect, a luminaire control system is provided. The luminaire system may include the above-mentioned luminaire and a user control device; the user control device may include a wall switch and/or a mobile terminal; the wall switch may include a physical switch and a virtual switch; the physical switch controls physical on and off of a circuit, the virtual switch may control power on and off of the light-emitting unit in the luminaire by using the controller.

According to a third aspect, a luminaire is provided. The luminaire may include: a controller, a power supply driver, a controllable switch, and a light-emitting unit. The controller may be connected to external alternating current and connected to both the power supply driver and the controllable switch through control signal wires; the power supply driver may be connected to the external alternating current, and converts an alternating current into a direct current and may provide the alternating current to the light-emitting unit; the controllable switch may be disposed in a circuit that connecting the power supply driver to the external alternating current or in a circuit between the power supply driver and the light-emitting unit. The controller may be in wired or wireless connection with a user control device to receive a control signal from a user; and a total number of the controllable switch may be one or more.

It is to be understood that both the foregoing general description and the following detailed description are exemplary and explanatory only and are not restrictive of the present disclosure.

BRIEF DESCRIPTION OF THE DRAWINGS

To explain the technical solutions in examples of the present disclosure more clearly, the accompanying drawings required for describing the examples will be described below in brief. Apparently, the accompanying drawings in the following description show merely some examples of the present disclosure, and other accompanying drawings may be derived from these accompanying drawings by an ordinary skilled in the art without creative efforts.

DETAILED DESCRIPTION

To make the objectives, technical solutions, and advantages of the present disclosure clearer, the present disclosure will be further described at below in detail with reference to the accompanying drawings. Apparently, the described examples are merely some of examples, rather than all the examples of the present disclosure. All other examples derived from the examples of the present disclosure by an ordinary skilled in the art without creative efforts shall fall within the protection scope of the present disclosure.

The control architecture for a lighting electrical appliance is a solution of a drive power source plus a controller, where the drive power source converts alternating current (AC) from public mains supply into direct current (DC), and the controller controls the magnitude of the DC to adjust the brightness or light color of the lighting electrical appliance. In the era of some lighting, such an architecture has been popularized without many defects. However, after entering the era of intelligent control, the inconveniences are as follows: a) when a user turns off a lighting device using a control terminal such as a mobile phone, the lighting device is still physically connected to the indoor power supply but not really switched off. This results in leakage current under in case of surges or induced current and causing the lighting device to shimmer, which the user will obviously perceive at night; b) after turning the light off using a mobile phone, if a user wants to turn the light on using a physical wall switch, he/she must shut down the wall switch before restarting. This leads to troublesome operation for the user, and even some users feel that the device is damaged. Similarly, if the physical wall switch is shut down, it is impossible for the user to turn the light on using the mobile phone.

To improve this situation, a method proposed may be to add a bypass or increase the impedance on light-source board side. Such method have the problem of too high cost, and the method can solve the above-mentioned problem a), but fail to solve the problem b).

Figure 1:
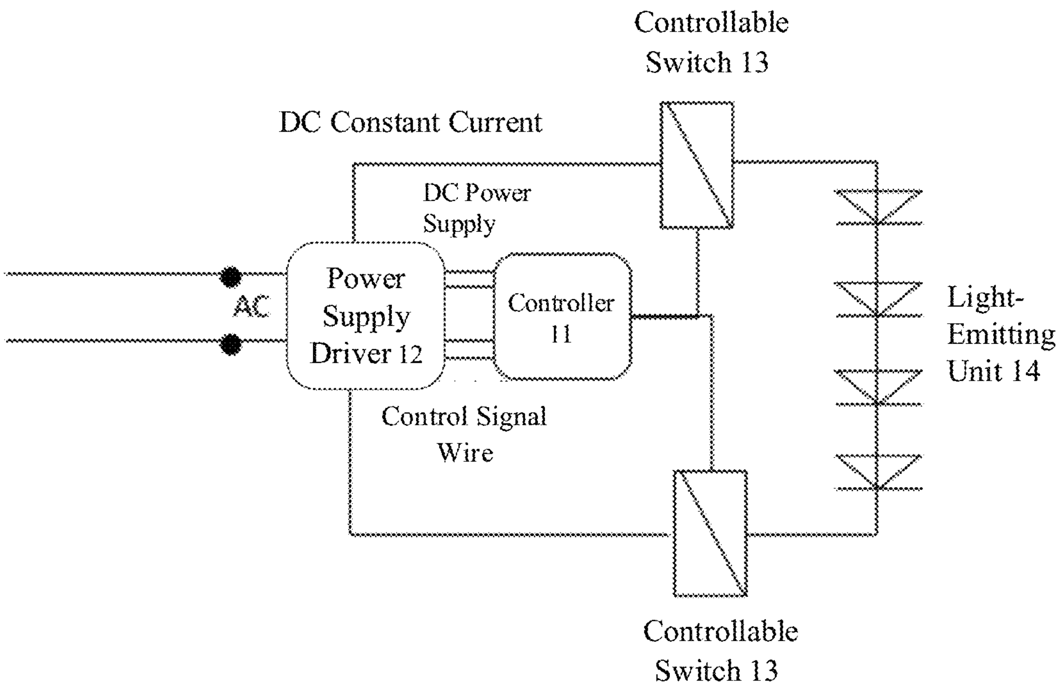
FIG. 1 is a structural diagram of a first preferred luminaire according to an example of the present disclosure.

FIG. 1 is a structural diagram of a first preferred luminaire according to an example of the present disclosure.

As shown in FIG. 1, a luminaire 1 includes a controller 11, a power supply driver 12, a controllable switch 13, and a light-emitting unit 14. Herein, the power supply driver 12 is connected to external alternating current AC. The power supply driver 12 converts the alternating current AC into direct current DC and provides the direct current DC to the controller 11 and the light-emitting unit 14. The controllable switch 13 is disposed in a circuit between the power supply driver 12 and the light-emitting unit 14. One or two controllable switches 13 may be used. When one controllable switch is used, the controllable switch 13 is disposed before a positive electrode or after a negative electrode of the light-emitting unit 14. When two controllable switches are used, one controllable switch 13 is disposed before the positive electrode of the light-emitting unit 14, and the other one is disposed after the negative electrode of the light-emitting unit 14; this can prevent ghost light due to breakdown of the controllable switch caused by sudden increase in the current of the circuit in which only one controllable switch is disposed. Alternatively, both of two controllable switches 13 are disposed before the positive electrode or after the negative electrode of the light-emitting unit 14, which can also prevent ghost light due to the sudden heavy current.

The controller 11 is connected to the power supply driver 12 and the controllable switch 13 through control signal wires. When the controller 11 receives a control signal from the outside, if the control signal is a switch signal, the controller transmits the switch signal to the controllable switch 13 to switch on or off the light-emitting unit 14. If the control signal is a dimming signal, the controller transmits the dimming signal to the power supply driver 12, so as to enable the power supply driver 12 to dim the light-emitting unit 14 by adjusting the current flowing through the light-emitting unit 14. The control signal received by the controller 11 is from a wall switch 2 or a user terminal 10. The controller 11 is in wired or wireless connection with the wall switch 2. The wall switch 2 may be a physical switch or a virtual switch, and the user terminal 10 may be a mobile phone or a tablet personal computer. The light-emitting unit 14 is preferably a light-emitting diode (LED) light source. The controllable switch 13 is preferably a relay.

Figure 2:
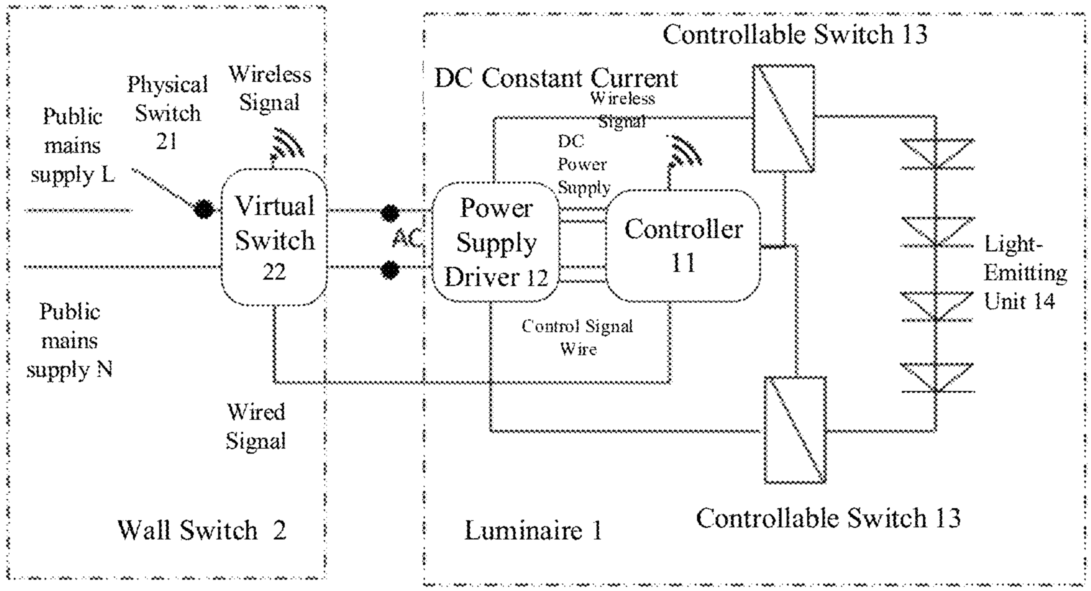
FIG. 2 is a structural diagram of a first preferred luminaire control circuit according to an example of the present disclosure.

FIG. 2 is a structural diagram of a first preferred luminaire control circuit according to an example of the present disclosure.

As shown in FIG. 2, a luminaire control system includes two parts: a wall switch 2 and a luminaire 1. Herein, the wall switch includes a physical switch 21 and a virtual switch 22. The physical switch 21 is electrically connected to both public mains power supply L and the virtual switch, and the virtual switch 22 is further electrically connected to the luminaire 1. The physical switch 21 controls power on or off of the virtual switch 22 and the luminaire 1.

The luminaire 1 includes a controller 11, a power supply driver 12, a controllable switch 13, and a light-emitting unit 14. Herein, the power supply driver 12 is electrically connected to the virtual switch 22, converts the alternating current AC into direct current DC and supplies the direct current DC to both the controller 11 and the light-emitting unit 14. The controllable switch 13 is disposed in a circuit between the power supply driver 12 and the light-emitting unit 14. One or two controllable switches 13 may be used. When one controllable switch is used, the controllable switch 13 is disposed before a positive electrode or after a negative electrode of the light-emitting unit 14. When two controllable switches are used, one controllable switch 13 is disposed before the positive electrode of the light-emitting unit 14, and the other one is disposed after the negative electrode of the light-emitting unit 14; this can prevent breakdown of the controllable switch caused by sudden increase in the current of the circuit in which only one controllable switch is disposed.

The controller 11 is in wired signal or wireless signal connection with the virtual switch 22 and receives an on-off signal and a dimming signal from the virtual switch 22. The controller 11 is in wireless signal connection with the mobile terminal 10 (not shown in FIG. 1) and receives the on-off signal and the dimming signal from the mobile terminal 10. The mobile terminal 10 may be a mobile phone or a tablet PC. The controller 11 is connected to both the power supply driver 12 and the controllable switch 13 through control signal wires, and controls operating modes of the power supply driver 12 and the controllable switch 13.

Both of the mobile terminal 10 and the virtual switch 22 can transmit the on-off signal and the dimming signal for the luminaire to the controller 11. For example, when the mobile terminal 10 or the virtual switch 22 transmits the on-off signal to the controller 11, the controller 11 transmits the on-off signal to the controllable switch 13 to change the on-off state of the controllable switch 13 from on to off or from off to on. Because each on-off signal causes the on-off state of the controllable switch 13 to change, such a control circuit solves the following problem: when the mobile terminal 10 turns the light off, if a user wants to turn the light on by using a physical wall switch, the user must shut down the wall switch before restarting. When the mobile terminal 10 or the virtual switch 22 transmits a dimming signal for the luminaire to the controller 11, the controller 11 transmits the dimming signal to the power supply driver, so as to adjust the brightness or light color by controlling the current flowing through the light-emitting unit 14. The controllable switch 13 is preferably a relay.

Figure 3:
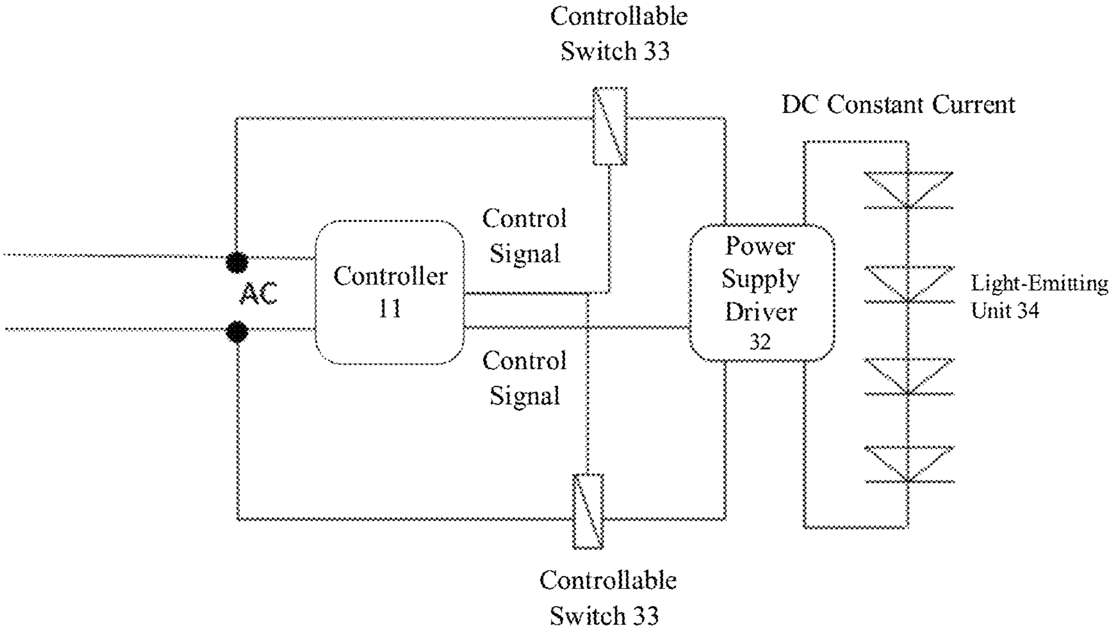
FIG. 3 is a structural diagram of a second preferred luminaire according to an example of the present disclosure.

FIG. 3 is a structural diagram of a second preferred luminaire according to an example of the present disclosure.

As shown in FIG. 3, the luminaire 3 includes a controller 31, a power supply driver 32, a controllable switch 33, and a light-emitting unit 34. Herein, the controller 31 and the power supply driver 32 are both connected to public mains supply, i.e., the alternating current AC. The controllable switch 33 is disposed in a circuit between the public mains supply and the power supply driver 32. The power supply driver 32 converts the alternating current AC into the direct current DC and supplies the direct current DC to the light-emitting unit 34. One or two controllable switches 33 may be used. When one controllable switch is used, the controllable switch 33 is disposed before a positive electrode or after a negative electrode of the power supply driver 32. When two controllable switches are used, one controllable switch 33 is disposed before the positive electrode of the power supply driver 32, and the other one is disposed after the negative electrode of the power supply driver 32; this can prevent breakdown of the controllable switch caused by sudden increase in the current of the circuit in which only one controllable switch is disposed.

As described above, the controllable switch 33 is disposed in the circuit between the public mains supply and the power supply driver 32. Besides, the controllable switch 33 may also be disposed in a circuit (not shown in FIG. 3) between the power supply driver 32 and the light-emitting unit 34.

When the controllable switch 33 is disconnected, the light-emitting unit 34 is powered off, and the power supply driver 32 is still in a stand-by state.

The controller 31 is connected to both the controllable switch 33 and the power supply driver 32 through control signal wires. When the controller 31 receives a control signal from the outside, the controller 31 determines whether the control signal is a switch signal or a dimming signal. If the control signal is the switch signal, the controller transmits the switch signal to the controllable switch 33, so as to enable the controllable switch 33 to switch on or off the power supply driver 32 and the light-emitting unit 34. If the control signal is the dimming signal, the controller transmits the dimming signal to the power supply driver 32, so as to enable the power supply driver 32 to dim the light-emitting unit 34 by adjusting the current flowing through the light-emitting unit 34. The control signal received by the controller 31 is from the wall switch 2 (not shown) or the user terminal 10 (not shown). The controller 31 is in wired or wireless connection with the wall switch 2. The wall switch 2 may be a physical switch or a virtual switch, and the user terminal 10 may be a mobile phone or a tablet PC. The light-emitting unit 34 is preferably an LED light source. The controllable switch 33 is preferably a relay.

Figure 4:
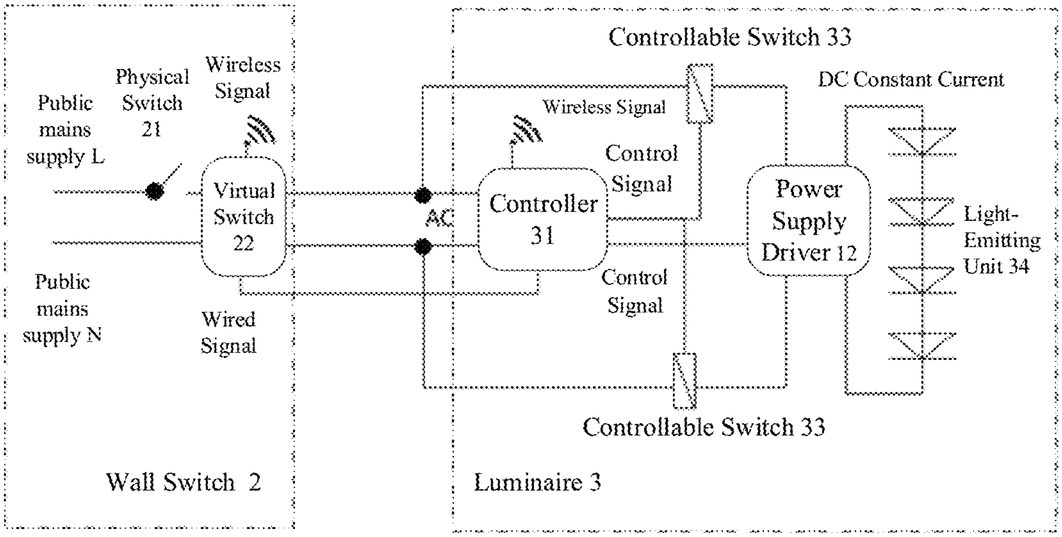
FIG. 4 is a structural diagram of a second preferred luminaire control circuit according to an example of the present disclosure.

FIG. 4 is a structural diagram of a second preferred luminaire control circuit according to an example of the present disclosure.

As shown in FIG. 4, the luminaire control circuit includes two parts: a wall switch 2 and a luminaire 3. Herein, the wall switch 2 includes a physical switch 21 and a virtual switch 22. The physical switch 21 is electrically connected to public mains supply L and the virtual switch 22, and the virtual switch 22 is further electrically connected to the luminaire 3. The physical switch 21 controls power on or off of the virtual switch 22 and the luminaire 3.

The luminaire 3 includes a controller 31, a power supply driver 32, a controllable switch 33, and a light-emitting unit 34. Herein, the controller 31 and the power supply driver 32 are both electrically connected to the virtual switch 22, that is, the public mains supply provides the alternating current AC to the controller 31 and the power supply driver 32. The controllable switch 33 is disposed in a circuit between the public mains supply and the power supply driver 32. The power supply driver 32 converts the alternating current AC into direct current DC and supplies the direct current DC to the light-emitting unit 34. One or two controllable switches 33 may be used. When one controllable switch is used, the controllable switch 33 is disposed before a positive electrode or after a negative electrode of the power supply driver 32. When two controllable switches are used, one controllable switch 33 is disposed before the positive electrode of the power supply driver 32, and the other one is disposed after the negative electrode of the power supply driver 32; this can prevent breakdown of the controllable switch caused by sudden increase in the current of the circuit in which only one controllable switch is disposed.

The controller 31 is connected to the virtual switch 22 through a control signal wire or is in a wireless signal connection with the virtual switch 22. The controller 31 is further in wireless signal connection with the mobile terminal 10. The controller 31 may receive control signals from the virtual switch 22 and the user terminal 10, respectively, and the control signal may be a switch signal or a dimming signal. The mobile terminal may be a mobile phone or a tablet PC.

The controller 31 is connected to both the controllable switch 33 and the power supply driver 32 through control signal wires. When the controller 31 receives a control signal transmitted from the virtual switch 22 or the mobile terminal 10, the controller 31 determines whether the control signal is a switch signal or a dimming signal. If the control signal is the switch signal, the controller transmits the switch signal to the controllable switch 33, so as to enable the controllable switch 33 to switch on or off the power supply driver 32 and the light-emitting unit 34. If the control signal is the dimming signal, the controller transmits the dimming signal to the power supply driver 32, so as to enable the power supply driver 32 to dim the light-emitting unit 34 by adjusting the current flowing through the light-emitting unit 34. The light-emitting unit 34 is preferably an LED light source. The controllable switch 33 is preferably a relay.

Figure 5:
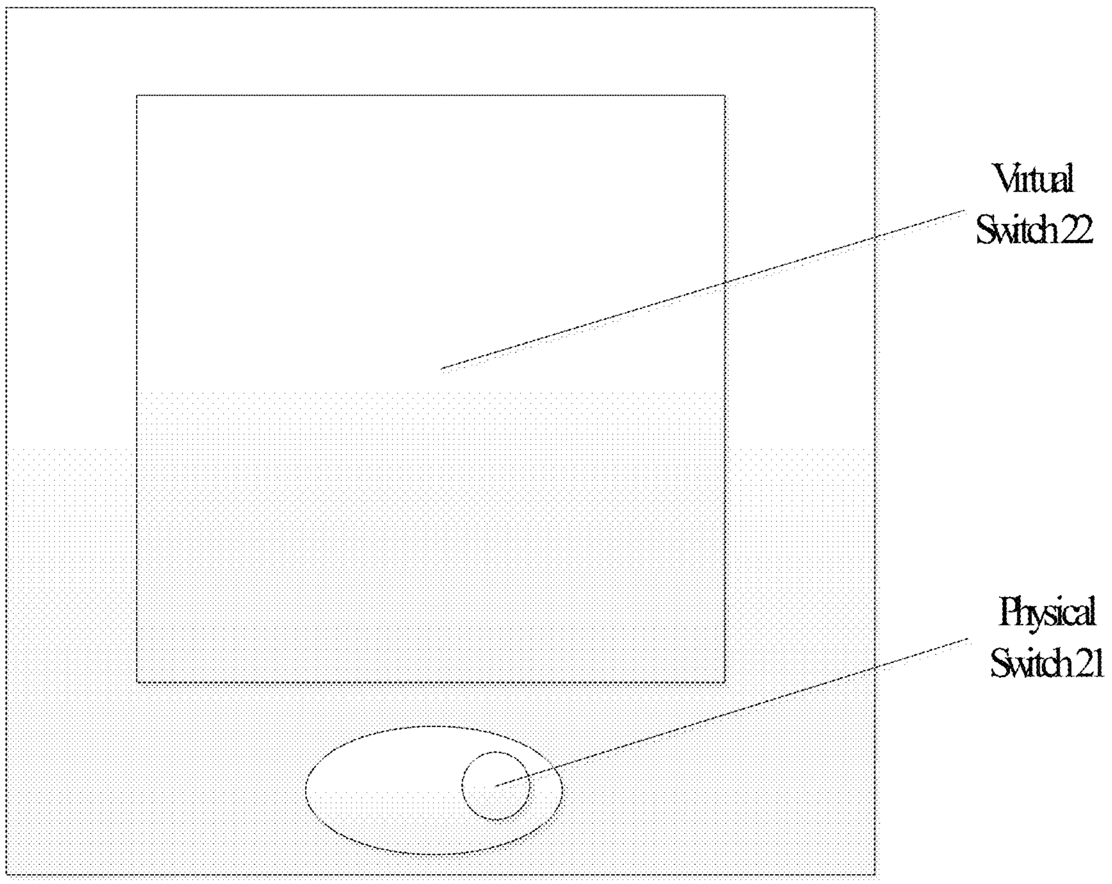
FIG. 5 is a structural diagram of a wall switch according to an example of the present disclosure.

FIG. 5 is a structural diagram of a preferred wall switch according to an example of the present disclosure.

As shown in FIG. 5, the wall switch 2 includes two parts: a physical switch 21 and a virtual switch 22. The physical switch 21 is miniaturized and normally open by default. In FIG. 5, the physical switch 21 is shown as a small slider, which is convenient for a user to safely cut off all power supply when repairing and installing the luminaire. The reason for designing the physical switch 21 with such a configuration is that the luminaire is mainly controlled by means of the virtual switch 22 and the mobile terminal 10, but the physical switch 21 is rarely used, accordingly, the physical switch 21 is miniaturized. It can be contemplated that, due to that the physical switch is rarely used and in order to prevent misoperation, a baffle plate that may be turned over or slid may be disposed outside the physical switch to hide the physical switch 21.

The virtual switch 22 may be designed as a key switch which senses the operation of a user and transmits the operation information to the controller of the luminaire by means of a wire or wirelessly. The virtual switch 22 is not limited to power driving modes, such as single live wire driving or neutral-live wires driving.

The present disclosure provides a luminaire and a luminaire control system.

First technical solution of the present disclosure is: a luminaire, comprising a controller, a power supply driver, a controllable switch, and a light-emitting unit, wherein: the power supply driver is connected to external alternating current and supplies power to the controller and the light-emitting unit; the controller is connected to both the power supply driver and the controllable switch through control signal wires; the controllable switch is disposed in a circuit between the power supply driver and the light-emitting unit; wherein the controller is in wired or wireless connection with a user control device to receive a control signal from a user; and a total number of the controllable switch disposed between the power supply driver and the light-emitting unit is one or more.

Optionally, the power supply driver supplies the power to the controller and the light-emitting unit, comprises: the power supply driver converts an alternating current into a direct current and provides the direct current to the controller and the light-emitting unit.

Optionally, when the controller receives an on-off signal, the controller transmits the on-off signal to the controllable switch to control power on or off of the light-emitting unit; and when the controller receives a dimming signal, the controller transmits the dimming signal to the power supply driver to dim the light-emitting unit.

Optionally, the controllable switch is disposed on a positive electrode of the light-emitting unit, or on a negative electrode of the light-emitting unit, or on both of the positive electrode or the negative electrode of the light-emitting unit.

Optionally, the power supply driver adjusts brightness or light color of the light-emitting unit.

Second technical solution is: a luminaire control system, comprising the above-mentioned luminaire and a user control device; the user control device comprises a wall switch and/or a mobile terminal; the wall switch comprises a physical switch and a virtual switch; the physical switch controls physical on and off of a circuit, the virtual switch controls power on and off of the light-emitting unit in the luminaire by using the controller.

Optionally, the virtual switch is connected to the power supply driver in the luminaire; and the virtual switch is in wired or wireless signal connection with the controller in the luminaire.

Third technical solution is: a luminaire, comprising: a controller, a power supply driver, a controllable switch, and a light-emitting unit; the controller is connected to external alternating current and connected to both the power supply driver and the controllable switch through control signal wires; the power supply driver is connected to the external alternating current, and converts an alternating current into a direct current and provides the alternating current to the light-emitting unit; the controllable switch is disposed in a circuit that connecting the power supply driver to the external alternating current or in a circuit between the power supply driver and the light-emitting unit; wherein the controller is in wired or wireless connection with a user control device to receive a control signal from a user; and a total number of the controllable switch is one or more.

Optionally, when the controller receives an on-off signal, the controller transmits the on-off signal to the controllable switch to control power on and off of the light-emitting unit; and when the controller receives a dimming signal, the controller transmits the dimming signal to the power supply driver to dim the light-emitting unit.

Optionally, the controllable switch is disposed on a positive electrode of the power supply driver, or a negative electrode of the power supply driver, or on both of the positive electrode or the negative electrode of the power supply driver.

Optionally, the power supply driver adjusts brightness or light color of the light-emitting unit.

Fourth technical solution is: a luminaire control system, comprising the above-mentioned luminaire and a user control device; the user control device comprises a wall switch and/or a mobile terminal; wherein the wall switch comprises a physical switch and a virtual switch; the physical switch controls physical on and off of a circuit, the virtual switch controls power on and off of the light-emitting unit in the luminaire by using the controller.

Optionally, the virtual switch is connected to both the power supply driver and the controller in the luminaire; and the virtual switch is in wired or wireless signal connection with the controller in the luminaire.

The present disclosure has the following beneficial effects: according to the technical solutions of the present disclosure, the controllable switch is disposed in the luminaire, and the switch of the luminaire is configured as a combination of the physical switch and the virtual switch. The technical solutions can completely eliminate the ghost light caused by sudden increases in current, and at the same time, the switch on and off and dimming of the luminaire can be achieved by using both of the virtual switch and a mobile terminal of a user. Thus, the problem of inconvenience in control when only a physical switch is used can be avoided.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Although some examples of the present disclosure have been described, those skilled in the art can make variations and modifications to these examples once they learn the basic inventive concept.

Those skilled in the art can make various modifications and variations to the present disclosure without departing from the spirit and scope of the present disclosure. The present disclosure is intended to cover these modifications and variations.

The invention claimed is:

1. A luminaire, comprising a controller, a power supply driver, two controllable switches, a virtual switch, and a light-emitting unit, wherein:

the power supply driver is connected to an external alternating current and supplies power to the controller and the light-emitting unit;

the controller is connected to both the power supply driver and the two controllable switches through control signal wires;

the virtual switch is connected to the power supply driver;

the two controllable switches are disposed in a circuit between the power supply driver and the light-emitting unit;

the controller is in wireless connection with both a user control device and the virtual switch to receive an on-off signal and a dimming signal from a user, wherein the user control device comprises a wall switch and/or a mobile terminal;

wherein the wall switch comprises a physical switch and the virtual switch, the physical switch controls the virtual switch, the physical switch is a small slider and the physical switch comprises a baffle plate to hide the small slider to prevent misoperation when the physical switch is rarely used; and wherein the controller is in wireless connection with both the virtual switch and the mobile terminal, and the controller receives the on-off signal and the dimming signal from the virtual switch and the mobile terminal, such that either the virtual switch or the mobile terminal controls the controller to transmit the on-off signal to the two controllable switches to change an on-off state of the two controllable switches;

wherein the controller is configured to determining whether a control signal received from the virtual switch or the mobile terminal is the on-off signal or the dimming signal:

in response to determining that the control signal is the on-off signal, transmitting the on-off signal to the two controllable switches, the two controllable switches being configured to electrically connect or electrically disconnect the power supply driver with the light-emitting unit according to the on-off signal;

and in response to determining that the control signal is the dimming signal, transmitting the dimming signal to the power supply driver to dim the light-emitting unit.

2. The luminaire according to claim 1, wherein the power supply driver supplies the power to the controller and the light-emitting unit, comprises:

the power supply driver converts an alternating current into a direct current and provides the direct current to the controller and the light-emitting unit.

3. The luminaire according to claim 1, wherein:

a first controllable switch of the two controllable switches is disposed before a positive electrode of the power supply driver, and a second controllable switch of the two controllable switches is disposed after a negative electrode of the power supply driver.

4. The luminaire according to claim 1, wherein:

the power supply driver adjusts brightness or light color of the light-emitting unit.

5. A luminaire control system, comprising a luminaire and a user control device, wherein:

the luminaire comprises a controller, a power supply driver, two controllable switches, a virtual switch, and a light-emitting unit;

the power supply driver is connected to external alternating current and supplies power to the controller and the light-emitting unit;

the controller is connected to both the power supply driver and the two controllable switches through control signal wires;

the virtual switch is connected to the power supply driver;

the two controllable switches are disposed in a circuit between the power supply driver and the light-emitting unit;

the controller is in wireless connection with both the user control device and the virtual switch to receive an on-off signal and a dimming signal from a user;

the user control device comprises a wall switch and/or a mobile terminal;

the wall switch comprises a physical switch and the virtual switch, wherein the physical switch controls the virtual switch, the physical switch is a small slider and the physical switch comprises a baffle plate to hide the small slider to prevent misoperation when the physical switch is rarely used; and the physical switch controls physical on and off of a circuit, the virtual switch controls power on and off of the light-emitting unit in the luminaire by using the controller;

wherein the controller is in wireless connection with both the virtual switch and the mobile terminal, and the controller receives the on-off signal and the dimming signal from the virtual switch and the mobile terminal, such that either the virtual switch or the mobile terminal controls the controller to transmit the on-off signal to the two controllable switches to change an on-off state of the two controllable switches;

wherein the controller is configured to determining whether a control signal received from the virtual switch or the mobile terminal is the on-off signal or the dimming signal:

in response to determining that the control signal is the on-off signal, transmitting the on-off signal to the two controllable switches, the two controllable switches being configured to electrically connect or electrically disconnect the power supply driver with the light-emitting unit according to the on-off signal;

and in response to determining that the control signal is the dimming signal, transmitting the dimming signal to the power supply driver to dim the light-emitting unit.

6. A luminaire, comprising: a controller, a power supply driver, two controllable switches, a virtual switch, and a light-emitting unit, wherein:

the controller is connected to external alternating current and connected to both the power supply driver and the two controllable switches through control signal wires;

the power supply driver is connected to the external alternating current, and converts an alternating current into a direct current and provides the alternating current to the light-emitting unit;

the virtual switch is connected to the power supply driver;

the two controllable switches are disposed in a circuit connecting the power supply driver to the external alternating current, or the two controllable switches are disposed in a circuit between the power supply driver and the light-emitting unit;

the controller is in wireless connection with both a user control device and the virtual switch to receive an on-off signal and a dimming signal from a user, wherein the user control device comprises a wall switch and/or a mobile terminal;

wherein the wall switch comprises a physical switch and the virtual switch, the physical switch controls the virtual switch, the physical switch is a small slider and the physical switch comprises a baffle plate to hide the small slider to prevent misoperation when the physical switch is rarely used; and wherein the controller is in wireless connection with both the virtual switch and the mobile terminal, and the controller receives the on-off signal and the dimming signal from the virtual switch and the mobile terminal, such that either the virtual switch or the mobile terminal controls the controller to transmit the on-off signal to the two controllable switches to change an on-off state of the two controllable switches;

wherein the controller is configured to determining whether a control signal received from the virtual switch or the mobile terminal is the on-off signal or the dimming signal:

in response to determining that the control signal is the on-off signal, transmitting the on-off signal to the two controllable switches, the two controllable switches being configured to electrically connect or electrically disconnect the power supply driver with the light-emitting unit according to the on-off signal;

and in response to determining that the control signal is the dimming signal, transmitting the dimming signal to the power supply driver to dim the light-emitting unit.

7. The luminaire according to claim 6, wherein:

a first controllable switch of the two controllable switches is disposed before a positive electrode of the power supply driver, and a second controllable switch of the two controllable switches is disposed after a negative electrode of the power supply driver.

8. The luminaire according to claim 6, wherein:

the power supply driver adjusts brightness or light color of the light-emitting unit.

9. A luminaire control system, comprising the luminaire according to claim 6, and the user control device, wherein:

the physical switch controls physical on and off of a circuit, the virtual switch controls power on and off of the light-emitting unit in the luminaire by using the controller.

10. The luminaire control system according to claim 9, wherein:

the virtual switch is connected to both the power supply driver and the controller in the luminaire; and the virtual switch is in wired or wireless signal connection with the controller in the luminaire.

* * * * *